(No Model.)

C. H. LAUMAN.
ANNEALING FURNACE FOR GLASS.

No. 317,808. Patented May 12, 1885.

Witnesses:
Victor A. Lewis
Geo. L. Wheelock

Inventor.
Chas. H. Lauman
by Knight Bros.
Attorneys.

UNITED STATES PATENT OFFICE.

CHARLES H. LAUMAN, OF PITTSBURG, PENNSYLVANIA.

ANNEALING-FURNACE FOR GLASS.

SPECIFICATION forming part of Letters Patent No. 317,808, dated May 12, 1885.

Application filed December 20, 1884. (No model.)

*To all whom it may concern:*

Be it known that I, CHARLES H. LAUMAN, a citizen of the United States, residing at Pittsburg, in the county of Allegheny and State of Pennsylvania, have invented certain new and useful Improvements in Annealing-Furnaces for Glass, of which the following is a specification.

In the use of traveling leer-beds, as ordinarily constructed, difficulty is experienced from the too rapid heating and cooling of the beds, resulting in the warping or cracking of the glass in the course of tempering or annealing. To obviate this difficulty I have devised a traveling bed so constructed that while it is well adapted to resist the heat of the annealing-oven without injury it does not cause any rapid conduction of heat to or away from the glass resting upon it. To the above end I construct the traveling bed of the leer of a series of metallic frames hinged together, each containing a body of ashes or other non-conducting material coated below and on top with a suitable flux, which at the first heat will fuse so as to form a thoroughly air-tight envelope, preventing the escape of gases from the interior non-conducting body and maintaining the latter in practically unchanged condition.

Figure 1:
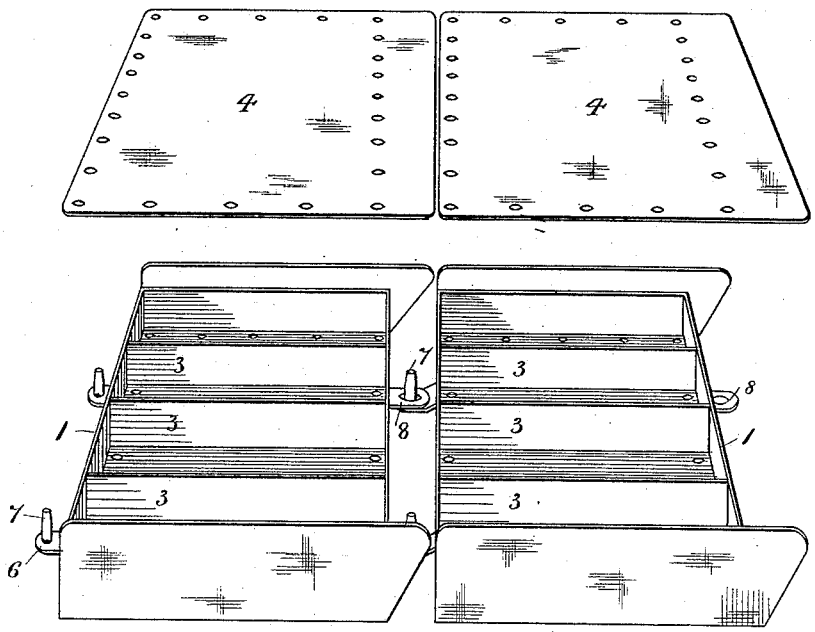
Figure 2:
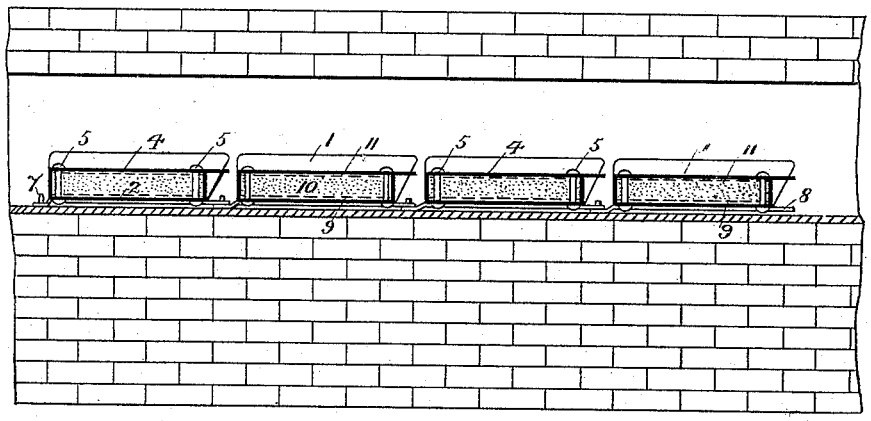

In the accompanying drawings, Figure 1 is a perspective view of parts of two frames of the traveling bed in readiness for the reception of the non-conducting material. Fig. 2 is a vertical section of a portion of the traveling bed completed for use and in position in the oven or leer.

The metallic frames 1 are made of sheet or plate iron of any suitable dimensions—as, for example, four feet by twenty-two inches, and may be four inches or more in depth. The frames are made with a bottom, 2, so as to form a pan or box, which pan or box is provided with partitions 3, to divide the interior into compartments for the reception of the non-conducting material, and is covered by a plate, 4, secured by rivets 5. The frames or boxes are connected together by means of hinge-plates 6, fixed to the bottom 2, as represented, each of said plates having a pin or hook, 7, on one end, and an eye, 8, in the other, for the purpose of connecting the boxes together in a flexible bed, as shown in Fig. 2.

The pan 1 2 being prepared as shown in Fig. 1, it is filled in the following manner: I mix about ten ounces of cerimonia with about five ounces of borax, the whole being thoroughly powdered and mingled. One half of this mixture is strewed in the bottom of the pan or box, as shown at 9. The pan or box is then filled with twelve pounds (more or less) of dry ashes, 10, and the remaining half of the flux-mixture is then strewed on the ashes, as seen at 11, after which the cover or top 4 is applied and firmly secured to the box by rivets 5. The articles to be annealed are placed upon the tops of the beds or trays thus constructed, and said beds or trays are placed in the leer in the usual manner.

In using the invention the first heat will melt the flux in the bottom and top of the box, securely welding the metallic plates together, forming air-tight joints and hermetically closing the interior. As it cools off, the gas which is generated condenses in the ashes, adapting the bed to cool slowly, and by its non-conducting qualities preventing too rapid cooling, and consequent cracking of the glass. In like manner the non-conducting bed avoids the conduction or application of increased heat suddenly to the glass, and thus prevents warping of the glass, which is a common difficulty with leer-beds of the usual construction.

My invention is applicable alike to leers for annealing window and other glass, as well as flint glass. It is also applicable to annealing-furnaces for other purposes.

Having thus described my invention, the following is what I claim as new therein and desire to secure by Letters Patent:

1. A traveling bed for annealing-leers, constructed with a metallic frame or box containing non-conducting material, as herein shown and described.

2. A traveling bed for annealing-leers, constructed with a hollow metallic frame or box, a body of non-conducting material contained therein, and a coat or cover of fusible matter or flux adapted by the application of heat to produce an air-tight envelope, as explained.

CHARLES H. LAUMAN.

Witnesses:
A. K. STEVENSON,
JAMES G. CORCORAN.